United States Patent
Glavaš et al.

(10) Patent No.: US 11,748,571 B1
(45) Date of Patent: Sep. 5, 2023

(54) TEXT SEGMENTATION WITH TWO-LEVEL TRANSFORMER AND AUXILIARY COHERENCE MODELING

(71) Applicant: Educational Testing Service, Princeton, NJ (US)

(72) Inventors: Goran Glavaš, Mannheim (DE); Swapna Somasundaran, Plainsboro, NJ (US)

(73) Assignee: Educational Testing Service, Princeton, NJ (US)

( * ) Notice: Subject to any disclaimer, the term of this patent is extended or adjusted under 35 U.S.C. 154(b) by 216 days.

(21) Appl. No.: 16/878,708

(22) Filed: May 20, 2020

Related U.S. Application Data (60) Provisional application No. 62/850,610, filed on May 21, 2019.

(51) Int. Cl.
| | |
|---|---|
| *G06F 40/289* | (2020.01) |
| *G06F 40/30* | (2020.01) |
| *G06N 3/096* | (2023.01) |
| *G06N 20/00* | (2019.01) |
| *G06F 40/284* | (2020.01) |
| *G06F 40/253* | (2020.01) |
| *G06N 3/08* | (2023.01) |

(52) U.S. Cl.
CPC ............ *G06F 40/30* (2020.01); *G06F 40/253* (2020.01); *G06F 40/284* (2020.01); *G06N 3/08* (2013.01); *G06N 20/00* (2019.01)

(58) Field of Classification Search
CPC ...... G06F 40/20; G06F 40/205; G06F 40/279; G06F 40/284; G06F 40/30; G06F 40/35; G06F 40/289; G06N 20/00; G06N 3/096

USPC .................. 704/1, 9; 706/12, 16, 21, 27, 31
See application file for complete search history.

(56) References Cited

U.S. PATENT DOCUMENTS

| | | | | |
|---|---|---|---|---|
| 7,580,827 | B1 * | 8/2009 | Brants | G06F 40/284 |
| | | | | 704/9 |
| 9,665,566 | B2 * | 5/2017 | Burstein | G06F 40/35 |
| 10,255,269 | B2 * | 4/2019 | Quirk | G06F 40/30 |
| 10,657,189 | B2 * | 5/2020 | Jagmohan | G06N 20/00 |
| 10,789,460 | B1 * | 9/2020 | Lapiello | G06F 40/284 |
| 10,936,827 | B1 * | 3/2021 | Gupta | G06F 40/45 |
| 11,031,003 | B2 * | 6/2021 | Asi | G06F 40/20 |

(Continued)

FOREIGN PATENT DOCUMENTS

| | | | | |
|---|---|---|---|---|
| WO | WO 2002/029547 | * | 4/2002 | ............... G06F 7/60 |
| WO | WO 2005/045695 | * | 5/2005 | ............. G06F 17/20 |

(Continued)

OTHER PUBLICATIONS

Alvarez-Mells, David, Jaakkola, Tommi; Gromov-Wasserstein Alignment of Word Embedding Spaces; Proceedings of the 2018 Conference on Empirical Methods in Natural Language Processing; pp. 1881-1890; Oct.-Nov. 2018.

(Continued)

*Primary Examiner* — Martin Lerner
(74) *Attorney, Agent, or Firm* — Jones Day (57) ABSTRACT

Data is received that encapsulates a document of text. The text is then segmented into a plurality of semantically coherent units using a coherence-aware text segmentation (CATS) machine learning model. Data is then provided that characterizes the segmenting. Related apparatus, systems, techniques and articles are also described.

20 Claims, 5 Drawing Sheets

(56) References Cited

U.S. PATENT DOCUMENTS

| | | | | |
|---|---|---|---|---|
| 11,210,470 | B2* | 12/2021 | Kim | G06F 40/30 |
| 2015/0248397 | A1* | 9/2015 | Burstein | G06F 40/35 |
| | | | | 704/9 |
| 2016/0350288 | A1* | 12/2016 | Wick | G06F 40/44 |
| 2018/0225274 | A1* | 8/2018 | Tommy | G06F 40/30 |
| 2018/0307679 | A1* | 10/2018 | Duong | G06F 40/30 |
| 2019/0236613 | A1* | 8/2019 | Dinh | G06F 40/289 |
| 2019/0287685 | A1* | 9/2019 | Wu | G06F 40/30 |
| 2020/0125944 | A1* | 4/2020 | Jauhar | G06F 40/30 |
| 2020/0134016 | A1* | 4/2020 | Cao | G06F 40/284 |
| 2020/0364307 | A1* | 11/2020 | Min | G06F 40/30 |
| 2022/0083744 | A1* | 3/2022 | Li | G06F 40/47 |
| 2022/0198144 | A1* | 6/2022 | Yang | G06F 40/30 |
| 2022/0237377 | A1* | 7/2022 | Zhang | G06F 40/205 |
| 2022/0318514 | A1* | 10/2022 | Puri | G06F 40/205 |
| 2022/0366143 | A1* | 11/2022 | Zhang | G06F 40/295 |

FOREIGN PATENT DOCUMENTS

| | | | | |
|---|---|---|---|---|
| WO | WO 2018/174816 | * | 9/2018 | G06F 17/27 |
| WO | WO 2022/040442 A1 * | 2/2022 | | G06N 3/02 |

OTHER PUBLICATIONS

Angheluta, Roxana, De Busser, Rik, Moens, Marie-Francine; The Use of Topic Segmentation for Automatic Summarization; Proceedings of the ACL-2002 Workshop on Automatic Summarization; 2002, (6 Pages).

Artetxe, Mikel, Labaka, Gorka, Agirre, Eneko; A Robust Self-Learning Method for Fully Unsupervised Cross-Lingual Mappings of Word Embeddings; Proceedings of the 56th Annual Meeting of the Association for Computational Linguistics; Melbourne, Australia; pp. 789-798; Jul. 2018.

Barzilay, Regina, Lapata, Mirella; Modeling Local Coherence: An Entity-Based Approach; Computational Linguistics, 34(1); pp. 1-34; 2008.

Beeferman, Doug, Berger, Adam, Lafferty, John; Statistical Models for Text Segmentation; Machine earning, 34(1-3); pp. 177-210; 1999.

Blei, David, NG, Andrew, Jordan, Michael; Latent Dirichlet Allocation; The Journal of Machine Learning Research, 3; pp. 993-1022; 2003.

Bokaei, Mohammad Hadi, Sameti, Hossein, Liu, Yang; Extractive Summarization of Multi-Party Meetings Through Discourse Segmentation; Natural Language Engineering, 22(1); pp. 41-72; 2016.

Brants, Thorsten, Chen, Francine, Tsochantaridis, Ioannis; Topic-Based Document Segmentation with Probabilistic Latent Semantic Analysis; Proceedings of the 11th International Conference on Information and Knowledge Management; pp. 211-218; Nov. 2002.

Chen, Harr, Branavan, S.R.K., Barzilay, Regina, Karger, David; Global Models of Document Structure Using Latent Permutations; Proceedings of the Human Language Technologies: The 2009 Annual Conference of the North American Chapter of the Association for Computational Linguistics; pp. 371-379; May 2009.

Choi, Freddy; Advances in Domain Independent Linear Text Segmentation; Proceedings of the 1st North American Chapter of the Association for Computational Linguistics; pp. 26-33; Apr. 2000.

Conneau, Alexis, Lample, Guillaume, Rinott, Ruty, Schwenk, Holger, Stoyanov, Ves; Xnli: Evaluating Cross-Lingual Sentence Representations; Proceedings of the Empirical Methods in Natural Language Processing; pp. 2475-2485; 2018.

Devlin, Jacob; Chang, Ming-Wei, Lee, Kenton, Toutanova, Kristina; Bert: Pre-Training of Deep Bidirectional Transformers for Language Understanding; Proceedings of the Conference of the North American Chapter of the Association for Computational Linguistics: Human Language Technologies, vol. 1; Minneapolis, MN; pp. 4171-4186; Jun. 2019.

Du, Lan, Buntine, Wray, Johnson, Mark; Topic Segmentation with a Structured Topic Model; Proceedings of the Conference of the North American Chapter of the Association for Computational Linguistics: Human Language Technologies, Atlanta, GA; pp. 190-200; Jun. 2013.

Eisenstein, Jacob; Hierarchical Text Segmentation from Multi-Scale Lexical Cohesion; Proceedings of the Conference of the North American Chapter of the Association for Computational Linguistics: Human Language Technologies, Boulder, CO; pp. 353-361; Jun. 2009.

Elsner, Micha, Charniak, Eugene; Extending the Entity Grid with Entity-Specific Features; Proceedings of the 49th Annual Meeting of the Association for Computational Linguistics; Portland, OR; pp. 125-129; Jun. 2011.

Faruqui, Manaal, Dyer, Chris; Improving Vector Space Word Representations Using Multilingual Correlation; Proceedings of the 14th Conference of the European Chapter of the Association for Computational Linguistics; Gothenburg, Sweden; pp. 462-471; Apr. 2014.

Feng, Vanessa Wei, Hirst, Graeme; Extending the Entity-Based Coherence Model with Multiple Ranks; Proceedings of the 13th Conference of the European Chapter of the Association for Computational Linguistics; Avignon, France, pp. 315-324; Apr. 2012.

Feng, Vanessa Wei, Lin, Ziheng, Hirst, Graeme; The Impact of Deep Hierarchical Discourse Structures in the Evaluation of Text Coherence; Proceedings of the 25th International Conference on Computational Linguistics; pp. 940-949; 2014.

Fragkou, Pavlina, Petridis, V., Kehagias, Athanasios; A Dynamic Programming Algorithm for Linear Text Segmentation; Journal of Intelligent Information Systems, 23(2); pp. 179-197; 2004.

Glavas, Goran, Nanni, Federico, Ponzetto, Simone Paolo; Unsupervised Text Segmentation Using Semantic Relatedness Graphs; Proceedings of the 5th Joint Conference on Lexical and Computational Semantics; Berlin, Germany; pp. 125-130; Aug. 2016.

Glavas, Goran, Litschko, Robert, Ruder, Sebastian, Vulic, Ivan; How to (Properly) Evaluate Cross-Lingual Word Embeddings: On Strong Baselines, Comparative Analyses, and Some Misconceptions; Proceedings of the 57th Annual Meeting of the Association for Computational Linguistics; Florence, Italy; pp. 710-721; Jul. 2019.

Griol, David, Molina, Jose Manuel; Do Human-Agent Conversations Resemble Human-Human Conversations ?; 12th International Conference on Distributed Computing and Artificial Intelligence; pp. 159-166; 2015.

Grosz, Barbara, Joshi, Aravind, Weinstein, Scott; Centering: A Framework for Modelling the Local Coherence of Discourse; Computational Linguistics, 21(2); pp. 203-226; Jan. 1995.

Halliday, M.A.K., Hasan, Ruqaiya; Cohesion in English; Longman: London, UK; 1976, (10 Pages).

Hearst, Marti; Multi-Paragraph Segmentation of Expository Text; Proceedings of the 32nd Annual Meeting on Association for Computational Linguistics; pp. 9-16; Jun. 1994.

Hofmann, Thomas; Probabilistic Latent Semantic Analysis; Proceedings of the 15th Conference on Uncertainty in Artificial Intelligence; pp. 289-296; 1999.

Hoshen, Yedid, Wolf, Lior; Non-Adversarial Unsupervised Word Translation; Proceedings of the 2018 Conference on Empirical Methods in Natural Language Processing; Brussels, Belgium; pp. 469-478I Oct.-Nov. 2018.

Huang, Xiangji, Peng, Fuchun, Schuurmans, Dale, Cercone, Nick, Robertson, Stephen; Applying Machine Learning to Text Segmentation for Information Retrieval; Information Retrieval, 6(3-4); pp. 333-362; 2003.

Kingma, Diederik, BA, Jimmy Lei; Adam: A Method for Stochastic Optimization; ICLR; 2015, (15 Pages).

Koshorek, Omri, Cohen, Adir, Mor, Noam, Rotman, Michael, Berant, Jonathan; Text Segmentation as a Supervised Learning Task; Proceedings of the 2018 Conference of the North American Chapter of the Association for Computational Linguistics: Human Language Technologies, vol. 2 (Short Papers); New Orleans, LA; pp. 469-473; Jun. 2018.

Li, Jiwei, Hovy, Eduard; A Model of Coherence Based on Distributed Sentence Representation; Proceedings of the 2014 Conference on Empirical Methods in Natural Language Processing; Doha, Qatar; pp. 2039-2048; Oct. 2014.

(56) References Cited

OTHER PUBLICATIONS

Malioutov, Igor, Barzilay, Regina; Minimum Cut Model for Spoken Lecture Segmentation; Proceedings of the 21st International Conference on Computational Linguistics and the 44th Annual Meeting of the Association for Computational Linguistics, Sydney, Australia, pp. 25-32; Jul. 2006.

Manuvinakurike, Ramesh, Paetzel, Maike, Qu, Cheng, Schlangen, David, DeVault, David; Toward Incremental Dialogue Act Segmentation In Fast-Paced Interactive Dialogue Systems; Proceedings of the 17th Annual Meeting of the Special Interest Group on Discourse and Dialogue; Los Angeles, CA; pp. 252-262; Sep. 2016.

Misra, Hemant, Yvon, Francois, Jose, Joemon, Cappe, Olivier; Text Segmentation via Topic Modeling: An Analytical Study; Proceedings of the 18th ACM Conference on Information and Knowledge Management; pp. 1553-1556; Nov. 2009.

Nguyen, Dat Tien, Joty, Shafiq; A Neural Local Coherence Model; Proceedings of the 55th Annual Meeting of the Association for Computational Linguistics, vol. 1, Long Papers; pp. 1320-1330; 2017.

Prince, Violaine, Labadie, Alexandre; Text Segmentation Based on Document Understanding for Information Retrieval; International Conference on Application of Natural Language to Information Systems; pp. 295-304; Jun. 2007.

Radford, Alec, Narasimhan, Karthik, Salimans, Tim, Sutskever, Ilya; Improving Language Understanding by Generative Pre-Training; Computer Science, Technical Report, Preprint; 2018, (12 Pages).

Riedl, Martin, Biemann, Chris; TopicTiling: A Text Segmentation Algorithm Based on LDA; Proceedings of the 2012 Student Research Workshop; Jeju, Republic of Korea; pp. 37-42; Jul. 2012.

Ruder, Sebastian, Vulic, Ivan, Sogaard, Anders; A Survey of Cross-Lingual Word Embedding Models; Journal of Artificial Intelligence Research, 65; pp. 569-631; Aug. 2019.

Shaw, Peter, Uszkoreit, Jakob, Vaswani, Ashish; Self-Attention with Relative Position Represenations; Proceedings of the 2018 Conference of the North American Chapter of the Association for Computational Linguistics: Human Language Technologies, vol. 2 (Short Papers); pp. 464-468; 2018.

Shtekh, Gennady, Kazakova, Polina, Nikitinsky, Nikita, Skachkov, Nikolay; Exploring Influence of Topic Segmentation on Information Retrieval Quality; International Conference on Internet Science; pp. 131-140; 2018.

Smith, Samuel, Turban, David, Hamblin, Steven, Hammerla, Nils; Offline Bilingual Word Vectors, Orthogonal Transformations and the Inverted Softmax; Proceedings of the ICLR; 2017, (10 Pages).

Utiyama, Masao, Isahara, Hitoshi; A Statistical Model for Domain-Independent Text Segmentation; Proceedings of the 39th Annual Meeting of the Association for Computational Linguistics; pp. 499-506; Jul. 2001.

Vaswani, Ashish, Shazeer, Noam, Parmar, Niki, Uszkoreit, Jakob, Jones, Llion, Gomez, Aidan, Kaiser, Lukasz, Polosukhin, Illia; Attention Is All You Need; 31st Conference on Neural Information Processing Systems; Long Beach, CA; pp. 5998-6008; 2017.

Yaari, Yaakov; Segmentation of Expository Texts by Hierarchical Agglomerative Clustering; Proceedings of RANLP; Sep. 1997, (7 Pages).

Yeh, Alexander; More Accurate Tests for the Statistical Significance of Result Differences; 18th International Conference on Computational Linguistics; Saarbruecken, Germany; pp. 947-953; Jul. 2000.

Zhao, Tianyu, Kawahara, Tatsuya; Joint Learning of Dialog Act Segmentation and Recognition in Spoken Dialog Using Neural Networks; Proceedings of the 8th International Joint Conference on Natural Language Processing; Taipei, Taiwan; pp. 704-712; Nov.-Dec. 2017.

* cited by examiner

TEXT SEGMENTATION WITH TWO-LEVEL TRANSFORMER AND AUXILIARY COHERENCE MODELING

RELATED APPLICATION

The current application claims priority to U.S. Pat. App. Ser. No. 62/850,610 filed on May 21, 2019, the contents of which are hereby fully incorporated by reference.

TECHNICAL FIELD

The subject matter described herein relates to enhanced techniques for computer-based text segmentation utilizing two-level transformer and auxiliary coherence modeling.

BACKGROUND

Natural language texts are, more often than not, a result of a deliberate cognitive effort of an author and as such consist of semantically coherent segments. Text segmentation deals with automatically breaking down the structure of text into such topically contiguous segments. Reliable segmentation results in texts that are more readable for humans and, additionally, can facilitate downstream tasks like automated text summarization, passage retrieval, topical classification, or dialog modeling.

Figure 1:
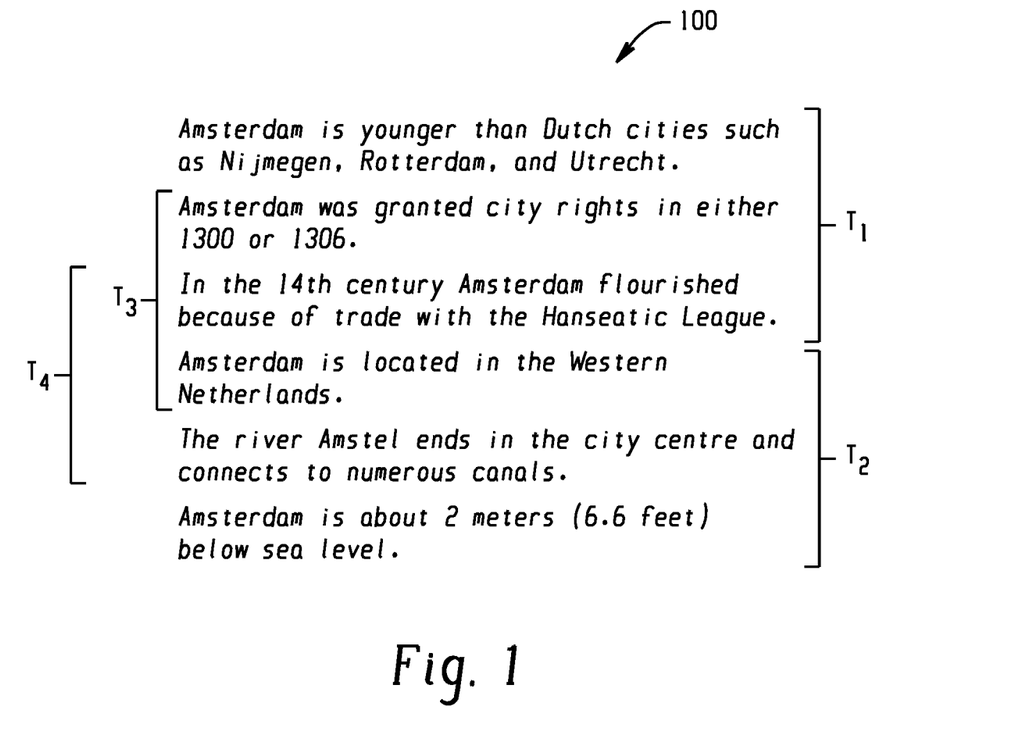
FIG. 1 is a diagram illustrating a sample passage of text.

Text coherence is inherently tied to text segmentation—intuitively, the text within a segment is expected to be more coherent than the text spanning different segments. Consider, as an example, the text in diagram 100 of FIG. 1, with two topical segments. Snippets $T_1$ and $T_2$ are more coherent than $T_3$ and $T_4$: all $T_1$ sentences relate to Amsterdam's history, and all $T_2$ sentences to Amsterdam's geography; in contrast, $T_3$ and $T_4$ contain sentences from both topics. $T_1$ and $T_2$ being more coherent than $T_3$ and $T_4$ signals that the fourth sentence starts a new segment. Despite the duality between text segmentation and coherence, conventional techniques for text segmentation only capture coherence implicitly.

SUMMARY

Though the segmentation of text depends on its (local) coherence, existing segmentation models capture coherence only implicitly via lexical or semantic overlap of (adjacent) sentences. Coherence-Aware Text Segmentation (CATS), a novel supervised model for text segmentation, is presented herein that couples segmentation prediction with explicit auxiliary coherence modeling. CATS is a neural architecture consisting of two hierarchically connected Transformer networks: the lower-level sentence encoder generates input for the higher-level encoder of sentence sequences. The CATS model is trained in a multi-task learning setup by learning to predict (i) sentence segmentation labels and (2) that original text snippets are more coherent than corrupt sentence sequences. The current subject matter demonstrates that CATS yields state-of-the-art performance on several text segmentation benchmarks and that it can—in a zero-shot language transfer setting, coupled with a cross-lingual word embedding space—successfully segment texts from target languages unseen in training.

In a first aspect, data is received that encapsulates a document of text. The text is then segmented into a plurality of semantically coherent units using a coherence-aware text segmentation (CATS) machine learning model. Data is then provided that characterizes the segmenting. Providing, in this regard, can include one or more of causing the data characterizing the segmenting to be displayed in a graphical user interface, loading the data characterizing the segmenting into memory, storing the data characterizing the segmenting in physical segmenting, or transmitting the data characterizing the segmenting to a remote computing device over a network.

The CATS machine learning model can include two hierarchically connected transformer networks. The document text can include a sequence of sentences of arbitrary length.

The text can be encoded into a plurality of tokens (i.e., the text can be tokenized) prior to the segmenting. The encoding can include a concatenation of a pretrained word embedding and a position embedding.

A first of the transformer networks can be a token-level transformer that encodes sentences from their corresponding tokens.

A second of the transformer networks can be a sentence-level transformer which receives an output of the first transformer network and generates transformed sentence representations including a representation of a whole sequence of sentences.

The transformed sentence representation can be provided to a feed forward segmentation classifier to generate a binary segmentation prediction for each sentence.

An encoding of the document of text can be fed to a neural network which is trained to generate a coherence score.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DETAILED DESCRIPTION

The current subject matter is directed to computer-implemented techniques for segmenting texts. Breaking down the structure of long texts into semantically coherent segments makes the texts more readable and supports downstream applications like summarization and retrieval. Starting from an apparent link between text coherence and segmentation, a supervised model for text segmentation with simple but explicit coherence modeling is provided herein. This model comprises a neural architecture having two hierarchically connected Transformer networks and is a multi-task learning model that couples the sentence-level segmentation objective with the coherence objective that differentiates correct sequences of sentences from corrupt ones. This model, referred to herein as Coherence-Aware Text Segmentation (CATS), was demonstrated to provide state-of-the-art segmentation performance on a collection of benchmark datasets. Furthermore, by coupling CATS with cross-lingual word embeddings, the effectiveness of the advances herein are demonstrated in zero-shot language transfer: the model can successfully segment texts in languages unseen in training.

As stated above, the current subject matter provides a supervised neural model for text segmentation that explicitly takes coherence into account by augmenting the segmentation prediction objective with an auxiliary coherence modeling objective. CATS encodes a sentence sequence using two hierarchically connected Transformer networks. CATS' main learning objective is a binary sentence-level segmentation prediction. However, CATS augments the segmentation objective with an auxiliary coherence-based objective which pushes the model to predict higher coherence for original text snippets than for corrupt (i.e., fake) sentence sequences. It has been empirically shown (1) that even without the auxiliary coherence objective, the Two-Level Transformer model for Text Segmentation (TLT-TS) yields state-of-the-art performance across multiple benchmarks, (2) that the full CATS model, with the auxiliary coherence modeling, further significantly improves the segmentation, and (3) that both TLT-TS and CATS are robust in domain transfer. Furthermore, CATS is demonstrated as being effective in zero-shot language transfer. Coupled with a cross-lingual word embedding space, the CATS model trained on English Wikipedia successfully segments texts from unseen languages, outperforming the best-performing unsupervised segmentation models.

Figure 2A:
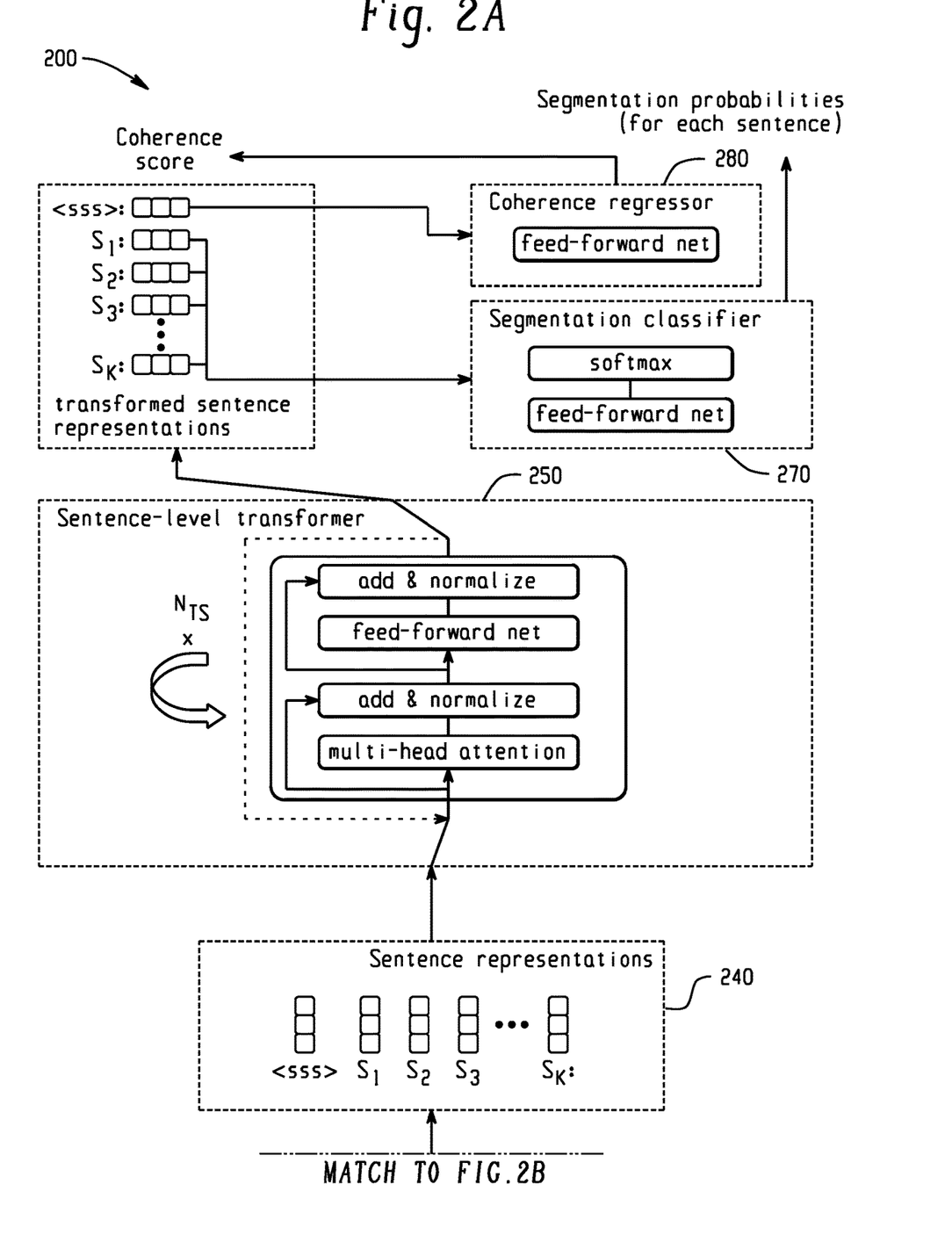
FIG. 2 is a diagram illustrating an example architecture for implementing a Coherence-Aware Text Segmentation (CATS) model.
Figure 2B:
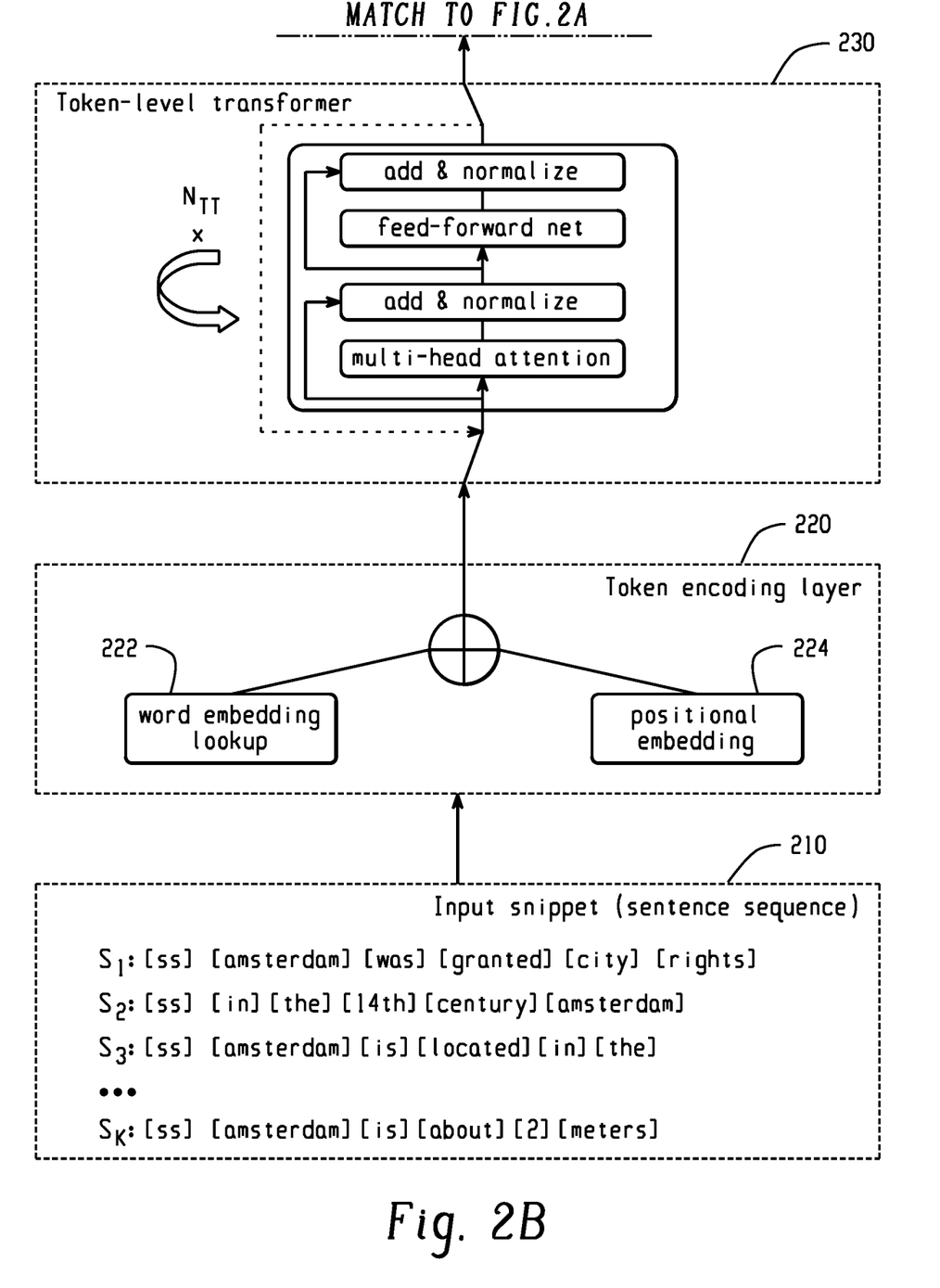

FIG. 2 is a diagram 200 that illustrates a high-level architecture of the CATS model. A snippet of text 210—a sequence of sentences of fixed length—is input to a token encoding layer 220 of the model. Token encodings can be concatenation of a pretrained word embedding 222 and a positional embedding 224. Sentences are first encoded from their tokens with a token-level transformer 230. Next, the resulting sequence of obtained sentence representations 240 are fed to a second, sentence-level transformer 250. Transformed (i.e., contextualized) sentence representations 260 are next fed to a feed-forward segmentation classifier 270, which makes a binary segmentation prediction for each sentence. In addition, the encoding of the whole snippet (i.e., the sentence sequence) is fed to a coherence regressor 280 (a feed-forward net), which predicts a coherence score.

Transformer-Based Segmentation. The segmentation decision for a sentence clearly does not depend only on its content but also on its context, i.e., information from neighboring sentences. With the current subject matter, an encoding stack of an attention-based Transformer architecture is used to contextualize both token representations in a sentence (token-level Transformer network) and, more importantly, sentence representations within the snippet (sentence-level Transformer network). Transformer encoders are utilized because they (1) outperform recurrent encoders on a range of natural language processing tasks and (2) are faster to train than recurrent nets.

Sentence Encoding. Let $\mathbb{S}=\{S_1, S_2, \ldots, S_K\}$ denote a single training instance—a snippet consisting of K sentences and let each sentence $S=\{t_1^i, t_2^i, \ldots, t_T^i\}$ be a fixed-size sequence of T tokens. Each sentence $S_i$ is prepended with a special sentence start token $t_0^i = [ss]$, aiming to use the transformed representation of that token as the sentence encoding. Each token $t_j^i$ ($i \in \{1, \ldots, K\}, j \in \{0, 1, \ldots, T\}$) is encoded with a vector $t_j^i$ which is the concatenation of a $d_e$-dimensional word embedding and a $d_p$-dimensional embedding of the position j. Pretrained word embeddings can be used and fixed in training; positional embeddings can be learned as the parameters of the models. Let $\text{Transform}_T$ denote the encoder stack of the Transformer model, consisting of $N_{TT}$ layers, each coupling a multi-head attention net with a feed-forward net. $\text{Transform}_T$ is then applied to the token sequence of each snippet sentence:

$$\{tt_j^i\}_{j=0}^T = \text{Transform}_T(\{t_j^i\}_{j=0}^T); \quad (1)$$

The sentence encoding is then the transformed vector of the sentence start token [ss]: $s_i = tt_0^i$.

Sentence Contextualization. Sentence encodings $\{s_i\}_{i=1}^K$ produced with $\text{Transform}_T$ only capture the content of the sentence itself, but not its context. A second, sentence-level Transformer $\text{Transforms}_S$ (with $N_{TS}$ layers) is employed to produce context-informed sentence representations. Each sequence of non-contextualized sentence embeddings $\{s_i\}_{i=1}^K$ is prepended with a fixed embedding $s_0$, denoting the snippet start token <sss>, in order to capture the encoding of the whole snippet (i.e., sequence of K sentences) as the transformed embedding of the <sss> token:

$$\{ss_i\}_{i=0}^K = \text{Transform}_S(\{s_i\}_{i=0}^K); \quad (2)$$

with the transformed vector $ss_0$, being the encoding of the whole snippet $\mathbb{S}$.

Segmentation Classification. Finally, contextualized sentence vectors $ss_i$ go into the segmentation classifier, a single-layer feed-forward net coupled with softmax function:

$$\hat{y}_i = \text{softmax}(ss_i W_{seg} + b_{seg}); \quad (3)$$

with $W_{seg} \in \mathbb{R}^{(de+dp) \times 2}$ and $b_{seg} \in \mathbb{R}^2$ as classifier's parameters. Let $y_i \in \{[0, 1], [1, 0]\}$ be the true segmentation label of the i-th sentence. The segmentation loss $J_{seg}$ is then the simple negative log-likelihood over all sentences of all N snippets in the training batch:

$$J_{seg} = -\Sigma_{n=1}^N \Sigma_{i=1}^K \ln \hat{y}_i^n \cdot \hat{y}_i^n; \quad (4)$$

Auxiliary Coherence Modeling. Giving the obvious dependency between segmentation and coherence, the segmentation task can be paired with an auxiliary task of predicting snippet coherence. To this effect, each true snippet $\mathbb{S}$ from the original text can be coupled with a corrupt (i.e., incoherent) snippet $\overline{\mathbb{S}}$, created by (1) randomly shuffling the order of sentences in S and (2) randomly replacing sentences.

Let $(\mathbb{S}, \overline{\mathbb{S}})$ be a pair of a true snippet and its corrupt counterpart, and $(ss_0, \overline{ss}_0)$ their respective encodings, obtained with the Two-Level Transformer. The encodings of the correct snippet ($ss_0$) and the scrambled snippet ($\overline{ss}_0$) are then presented to the coherence regressor, which independently generates a coherence score for each of them. The scalar output of the coherence regressor is:

$$\hat{y}\mathbb{S} = ss_0 w_c + b_c; \hat{y}\overline{\mathbb{S}} = \overline{ss}_0 w_c + b_c; \quad (5)$$

with $w_c \in \mathbb{R}^{de+dp}$ and $b_c \in \mathbb{R}$ as regressor's parameters. The scores for $\mathbb{S}$ and $\overline{\mathbb{S}}$: are then jointly softmax-normalized as follows:

$$x[\text{coh}(\mathbb{S}), \text{coh}(\overline{\mathbb{S}})] = \text{softmax}([\hat{y}\mathbb{S}, \hat{y}\overline{\mathbb{S}}]); \quad (6)$$

It is desirable to force the model to produce higher coherence score for the correct snippet $\mathbb{S}$ than for its corrupt counterpart $\overline{\mathbb{S}}$. As such, the following contrastive margin-based coherence objective can be defined:

$$J_{coh} = \max(0, \delta_{coh} - (\text{coh}(\mathbb{S}) - \text{coh}(\overline{\mathbb{S}}))); \quad (7)$$

where $\delta_{coh}$ is the margin for which coh($\mathbb{S}$) is to be larger than coh($\overline{\mathbb{S}}$).

Creating Training Instances. The presumed training corpus contains documents that are generally longer than the snippet size K and annotated for segmentation at the sentence level. Training instances can be created by sliding a sentence window of size K over documents' sentences with a stride of K/2. For the sake of auxiliary coherence modeling, for each original snippet $\mathbb{S}$, its corrupt counterpart $\overline{\mathbb{S}}$ can be created with the following corruption procedure: (1) firstly randomly shuffle the order of sentences in $\mathbb{S}$; (2) for $p_1$ percent of snippets (random selection) additionally replace sentences of the shuffled snippet (with the probability $P_2$) with randomly chosen sentences from other, non-overlapping document snippets.

Inference. At inference time, given a long document, a binary segmentation decision needs to be made for each sentence. The CATS model, however, does not take individual sentences as input, but rather sequences of K sentences (i.e., snippets) and makes in-context segmentation prediction for each sentence. As multiple different sequences of K consecutive sentences can be created that contain some sentence S, the CATS model can obtain multiple segmentation predictions for the same sentence. As it is not known a priori which of the snippets containing the sentence S is the most reliable with respect to the segmentation prediction for S, all possible snippets containing S are considered. In other words, at inference time, unlike in training, snippets can be created by sliding the window of K sentences over the document with the stride of 1. Let S={$\mathbb{S}_1, \mathbb{S}_2, \ldots, \mathbb{S}_K$}, be the set of (at most) K different snippets containing a sentence S. The segmentation probabilities predicted for the sentence S can be averaged over all snippets in S:

$$P_{seg}(S) = \frac{1}{K}\sum_{\mathbb{S}_k \in S} \hat{y}S(\mathbb{S}_k)[0]; \quad (8)$$

Finally, it is predicted that S starts a new segment if $P_{seg}(S) > \tau$, where $\tau$ is the confidence threshold, tuned as a hyperparameter of the model.

Cross-Lingual Zero-Shot Transfer. Models that do not require any language-specific features other than pretrained word embeddings as input can be easily transferred to another language by means of a cross-lingual word embedding space. Let $X_{L1}$ be the monolingual embedding space of the source language (most often English), which is used in training and let $X_{L2}$ be the independently trained embedding space of the target language to which the segmentation model is to be transferred. To transfer the model, target-language vectors can be projected from $X_{L2}$ to the source-language space $X_{L1}$. A supervised alignment model based on solving the Procrustes problem can be used due to its simplicity and competitive performance in zero-shot language transfer of NLP models (Glavaš et al. 2019). Given a limited-size word translation training dictionary D, the linear projection matrix $W_{L2 \to L1}$ between $X_{L2}$ and $X_{L1}$ is obtained as follows:

$$W_{L2 \to L1} = UV^T; U\Sigma V^T = SVD(X_S X_T^T); \quad (9)$$

with $X_S \subset X_{L1}$ and $X_T \subset X_{L2}$ as subsets of monolingual spaces that align vectors from training translations pairs from D. Once $W_{L2 \to L1}$ is obtained, the language transfer of the segmentation model is straightforward: the embeddings of L2 words from the projected space $X'_{L2} = X_{L2} W_{L2 \to L1}$ can be input.

Described below is information about the datasets used for model training and evaluation and, in addition, information about the comparative evaluation setup and model optimization.

WIKI-727K Corpus. Koshorek et al. (2018) leveraged the manual structuring of Wikipedia pages into sections to automatically create a large segmentation-annotated corpus. WIKI-727K consists of 727,746 documents created from English (EN) Wikipedia pages, divided into training (80%), development (10%), and test portions (10%). The models were trained, optimized, and evaluated on respective portions of the WIKI-727K dataset.

Standard Test Corpora. Koshorek et al. (2018) additionally created a small evaluation set WIKI-50 to allow for comparative evaluation against unsupervised segmentation models, e.g., the GRAPHSEG model of Glavas, Nanni, and Ponzetto (2016), for which evaluation on large datasets is prohibitively slow. For years, the synthetic dataset of Choi (2000) was used as a standard benchmark for text segmentation models. CHOI dataset contains 920 documents, each of which is a concatenation of 10 paragraphs randomly sampled from the Brown corpus. CHOI dataset is divided into subsets containing only documents with specific variability of segment lengths (e.g., segments with 3-5 or with 9-11 sentences). Finally, the performance of the models were evaluated on two small datasets, CITIES and ELEMENTS, created by Chen et al. (2009) from Wikipedia pages dedicated to the cities of the world and chemical elements, respectively.

Other Languages. In order to test the performance of the Transformer-based models in zero-shot language transfer setup, small evaluation datasets were created in other languages. Analogous to the WIKI-50 dataset created by Koshorek et al. (2018) from English (EN) Wikipedia, new datasets were created: WIKI-50-CS, WIKI-50-FI, and WIKI-50-TR datasets consisting of 50 randomly selected pages from Czech (CS), Finnish (FI), and Turkish (TR) Wikipedia, respectively.

Evaluation Metric. A standard text segmentation measure $P_k$ was adopted as the evaluation metric. $P_k$ score is the probability that a model makes a wrong prediction as to whether the first and last sentence of a randomly sampled snippet of k sentences belong to the same segment (i.e., the probability of the model predicting the same segment for the sentences from different segment or different segments for the sentences from the same segment). k is set to the half of the average ground truth segment size of the dataset.

Baseline Models. CATS was compared against the state-of-the-art neural segmentation model of Koshorek et al. (2018) and against GRAPHSEG, a state-of-the-art unsupervised text segmentation model. Additionally, a RANDOM baseline was evaluated—it assigns a positive segmentation label to a sentence with the probability that corresponds to the ratio of the total number of segments (according to the gold segmentation) and total number of sentences in the dataset.

Model Variants. Two variants of the two-level transformer text segmentation model were evaluated: with and without the auxiliary coherence modeling. The first model, TLT-TS, minimizes only the segmentation objective $J_{seg}$. CATS, the current model, is a multi-task learning model that alternately minimizes the segmentation objective $J_{seg}$ and the coherence objective $J_{coh}$. A balanced alternate training regime was adopted for CATS in which a single parameter update based on the minimization of $J_{seg}$ is followed by a single parameter update based on the optimization of $J_{coh}$.

Word Embeddings. In the experiments, 300-dimensional monolingual FASTTEXT word embeddings were used which were pre-trained on the Common Crawl corpora of respective languages: EN, CS, FI, and TR. A cross-lingual word embedding space was induced, needed for the zero-shot language transfer experiments, by projecting CS, FI, and TR monolingual embedding spaces to the EN embedding space. Training dictionaries D were created for learning projection matrices by machine translating 5,000 most frequent EN words to CS, FI, and TR.

Model Optimization. All hyperparameters were analyzed, including the data preparation parameters like the snippet size K, via cross-validation on the development portion of the Wiki-727K dataset. The following configuration was found to lead to robust performance for both TLT-TS and CATS: (1) training instance preparation: snippet size of K=16 sentences with T=50 tokens; scrambling probabilities $p_1=p_2=0.5$; (2) configuration of Transformers: $N_{TT}=N_{TS}=6$ layers and with 4 attention heads per layer in both transformers; (3) other model hyperparameters: positional embedding size of $d_p=10$; coherence objective contrastive margin of $\delta_{coh}=1$. Different optimal inference thresholds were found: $\tau=0.5$ for the segmentation-only TLT-TS model and $\tau=0.3$ for the coherence-aware CATS model. Both TLT-TS and CATS were trained in batches of N=32 snippets (each with K=16 sentences), using the Adam optimization algorithm with the initial learning rate set to $10^{-4}$.

Results. The current subject matter was informed based on various comparisons with conventional models.

TABLE 1

| Model | Model Type | WIKI-727K | WIKI-50 | CHOI | CITIES | ELEMENTS |
|---|---|---|---|---|---|---|
| RANDOM | unsupervised | 53.09 | 52.65 | 49.43 | 47.14 | 50.08 |
| GRAPHSEG | unsupervised | — | 63.56 | 5.6-7.2* | 39.95 | 49.12 |
| Koshorek et al. (2018) | supervised | 22.13 | 18.24 | 26.26 | 19.68 | 41.63 |
| TLT-TS | supervised | 19.41 | 17.47 | 23.26 | 19.21 | 20.33 |
| CATS | supervised | 15.95 | 16.53 | 18.50 | 16.85 | 18.41 |

Base Evaluation. Table 1 shows the CATS model performance on five EN evaluation datasets. Both of the Transformer-based models—TLT-TS and CATS—outperform the competing supervised model of Koshorek, a hierarchical encoder based on recurrent components, across the board. The improved performance that TLT-TS has with respect to the model of Koshorek is consistent with improvements that Transformer-based architectures yield in comparison with models based on recurrent components in other NLP tasks. The gap in performance is particularly wide (>20 $P_k$ points) for the ELEMENTS dataset. Evaluation on the ELEMENTS test set is, arguably, closest to a true domain-transfer setting: while the train portion of the WIKI-727K set contains pages similar in type to those found in WIKI-50 and CITIES test sets, it does not contain any Wikipedia pages about chemical elements (all such pages are in the ELEMENTS test set). This would suggest that TLT-TS and CATS offer more robust domain transfer than the recurrent model of Koshorek et al.

It was noted that CATS significantly and consistently outperforms TLT-TS. This empirically confirms the usefulness of explicit coherence modeling for text segmentation. Moreover, Koshorek reports human performance on the WIKI-50 dataset of 14.97, which is a mere one $P_k$ point better than the performance of the coherence-aware CATS model.

The unsupervised GRAPHSEG model outperforms supervised models on the synthetic CHOI dataset. It is believed that this is primarily because (1) by being synthetic, the CHOI dataset can be accurately segmented based on simple lexical overlaps and word embedding similarities (and GRAPHSEG relies on similarities between averaged word embeddings) and because (2) by being trained on a much more challenging real-world WIKI-727K dataset—on which lexical overlap is insufficient for accurate segmentation—supervised models learn to segment based on deeper natural language understanding (and learn not to encode lexical overlap as reliable segmentation signal). Additionally, GRAPHSEG is evaluated separately on each subset of the CHOI dataset, for each of which it is provided the (gold) minimal segment size, which further facilitates and improves its predicted segmentations.

TABLE 2

| Model | CS | FI | TR |
|---|---|---|---|
| RANDOM | 52.92 | 52.02 | 45.04 |
| GRAPHSEG | 49.47 | 49.28 | 39.21 |
| TLT-TS | 24.27 | 25.99 | 25.89 |
| CATS | 22.32 | 22.87 | 24.20 |

Zero-Shot Cross-Lingual Transfer. In Table 2, the results of the zero-shot cross-lingual transfer experiments are provided. In this setting, the current Transformer-based models are provided, trained on the English WIKI-727K dataset, to segment texts from the WIKI-50-X (X CS, FI, TR)∈datasets in other languages. As a baseline, GRAPHSEG was additionally evaluated as a language-agnostic model requiring only pre-trained word embeddings of the test language as input.

Both the Transformer-based models, TLT-TS and CATS, outperform the unsupervised GRAPHSEG model (which seems to be only marginally better than the random base-line) by a wide margin. The coherence-aware CATS model is again significantly better (p<0.01 for FI and p<0.05 for CS and TR) than the TLT-TS model which was trained to optimize only the segmentation objective. While the results on the WIKI-50-CS, FI, TR datasets are not directly comparable to the results reported on the EN WIKI-50 (see Table 1) because the datasets in different languages do not contain mutually comparable Wikipedia pages, results in Table 2 still suggest that the drop in performance due to the cross-lingual transfer is not large. This result indicates that it is possible to, via the zero-shot language transfer, obtain rather reliably segment texts from under-resourced languages lacking sufficiently large gold-segmented data needed to directly train language-specific segmentation models (that is, robust neural segmentation models in particular).

Figure 3:
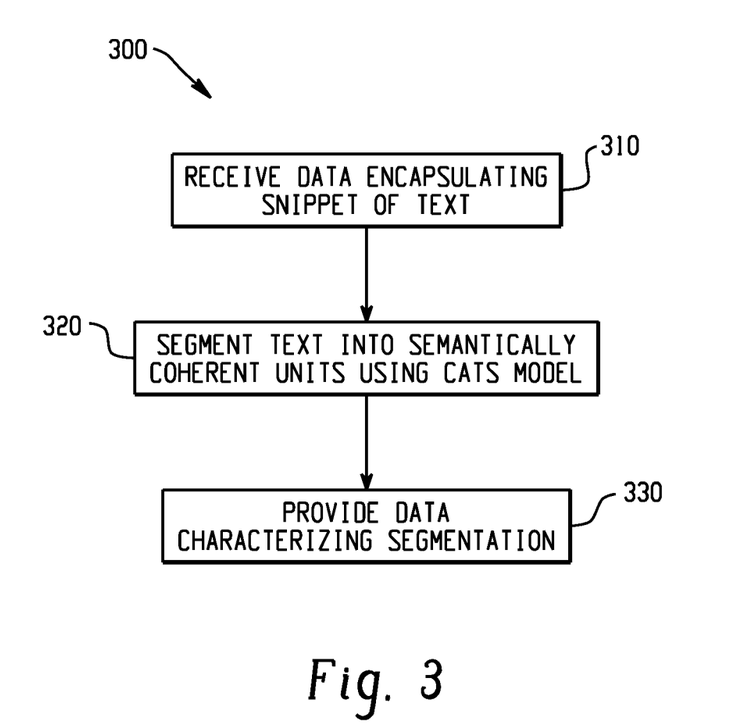
FIG. 3 is a process flow diagram illustrating improving text segmentation with two-level transformer and auxiliary coherence modeling.

FIG. 3 is a process flow diagram 300 in which, at 310, data encapsulating a snippet of text is received. Thereafter, at 320, the text is segmented into a plurality of semantically coherent units using a coherence-aware text segmentation (CATS) machine learning model. Subsequently, at 330, data is provided in a format (e.g., displayed in a graphical user interface, loaded into memory, stored to disk, transmitted to a remote computing device, etc.) which characterizes the segmentation.

Figure 4:
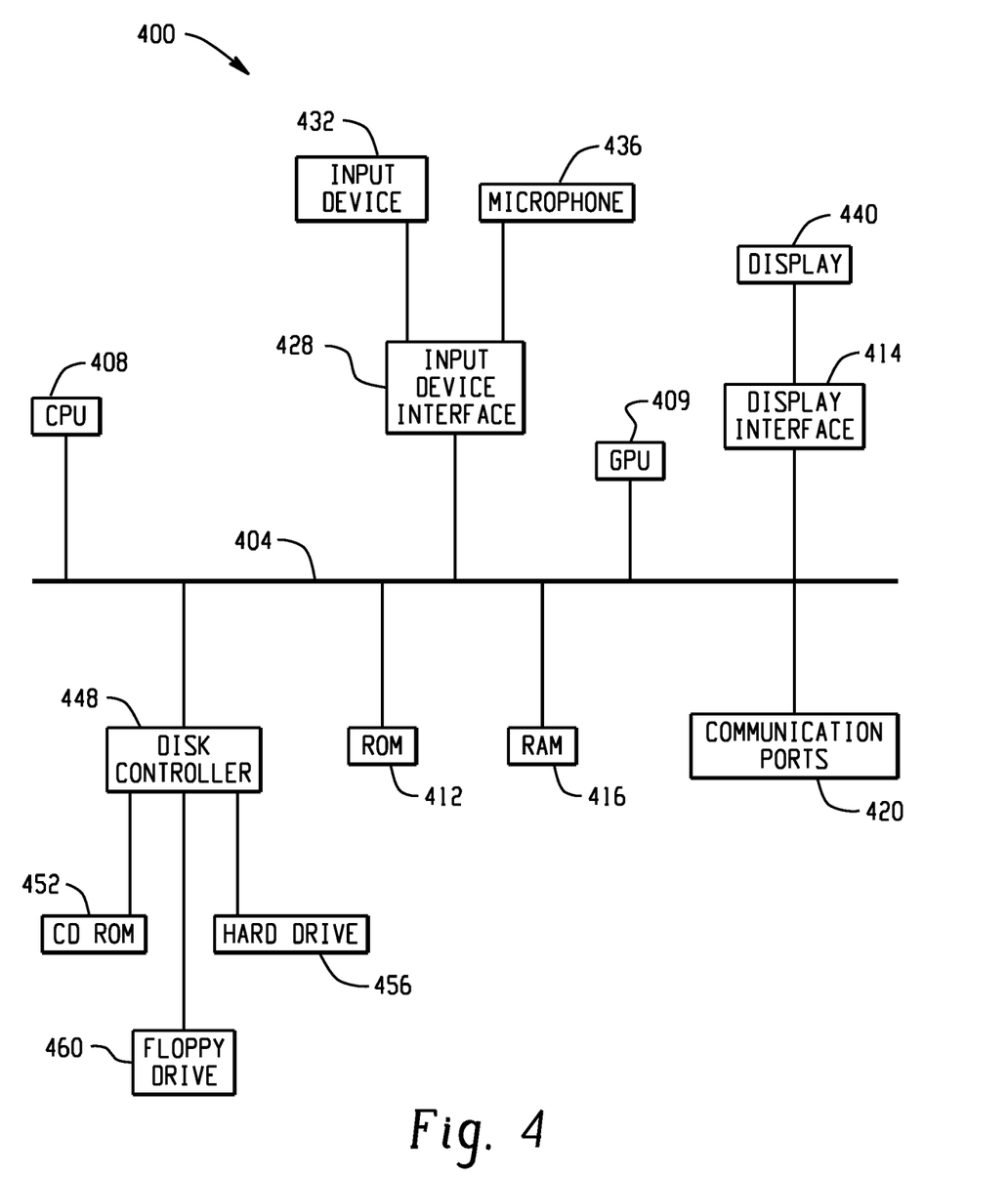
FIG. 4 is a diagram illustrating aspects of a computing device for implementing the current subject matter.

FIG. 4 is a diagram 400 illustrating a sample computing device architecture for implementing various aspects described herein. A bus 404 can serve as the information highway interconnecting the other illustrated components of the hardware. A processing system 408 labeled CPU (central processing unit) (e.g., one or more computer processors/data processors at a given computer or at multiple computers), can perform calculations and logic operations required to execute a program. A non-transitory processor-readable storage medium, such as read only memory (ROM) 412 and random access memory (RAM) 416, can be in communication with the processing system 408 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 448 can interface with one or more optional disk drives to the system bus 404. These disk drives can be external or internal floppy disk drives such as 460, external or internal CD-ROM, CD-R, CD-RW or DVD, or solid state drives such as 452, or external or internal hard drives 456. As indicated previously, these various disk drives 452, 456, 460 and disk controllers are optional devices. The system bus 404 can also include at least one communication port 420 to allow for communication with external devices either physically connected to the computing system or available externally through a wired or wireless network. In some cases, the at least one communication port 420 includes or otherwise comprises a network interface.

To provide for interaction with a user, the subject matter described herein can be implemented on a computing device having a display device 440 (e.g., a CRT (cathode ray tube) or LCD (liquid crystal display) monitor) for displaying information obtained from the bus 404 via a display interface 414 to the user and an input device 432 such as keyboard and/or a pointing device (e.g., a mouse or a trackball) and/or a touchscreen by which the user can provide input to the computer. Other kinds of input devices 432 can be used to provide for interaction with a user as well; for example, feedback provided to the user can be any form of sensory feedback (e.g., visual feedback, auditory feedback by way of a microphone 436, or tactile feedback); and input from the user can be received in any form, including acoustic, speech, or tactile input. The input device 432 and the microphone 436 can be coupled to and convey information via the bus 404 by way of an input device interface 428. Other computing devices, such as dedicated servers, can omit one or more of the display 440 and display interface 414, the input device 432, the microphone 436, and input device interface 428.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
receiving data encapsulating a document of text;
segmenting the text into a plurality of semantically coherent units using a coherence-aware text segmentation (CATS) machine learning model, the CATS machine learning model being a multi-task learning model that alternatively minimizes a sentence-level segmentation objective and a coherence objective and which differentiates correct sequences of sentences in the document from corrupt sequences of sentences in the document, the CATS model being generated by cross-lingual zero-shot transfer in which a supervised alignment model is used to project target-language vectors from an independently trained embedding space of a target language to a monolingual embedding space of a source language; and
providing data characterizing the segmenting.

2. The method of claim 1, wherein the CATS machine learning model comprises two hierarchically connected transformer networks.

3. The method of claim 2, wherein the document of text comprises a sequence of sentences of arbitrary length.

4. The method of claim 2 further comprising:
encoding the text into a plurality of tokens prior to the segmenting.

5. The method of claim 4, wherein the encoding comprises a concatenation of a pretrained word embedding and a position embedding.

6. The method of claim 4, wherein a first of the transformer networks is a token-level transformer that encodes sentences from their corresponding tokens.

7. The method of claim 4, wherein a second of the transformer networks is a sentence-level transformer which receives an output of the first transformer network and generates transformed sentence representations including a representation of a whole sequence of sentences.

8. The method of claim 7 further comprising:
providing the transformed sentence representation to a feed forward segmentation classifier to generate a binary segmentation prediction for each sentence.

9. The method of claim 7 further comprising:
feeding an encoding of the document of text to a neural network to generate a coherence score.

10. The method of claim 1, wherein providing the data comprises at least one of: causing the data characterizing the segmenting to be displayed in a graphical user interface, loading the data characterizing the segmenting into memory, storing the data characterizing the segmenting in physical persistence, or transmitting the data characterizing the segmenting to a remote computing device over a network.

11. A system comprising:
at least one data processor; and
memory storing instructions which, when executed by the at least one data processor, result in operations comprising:
receiving data encapsulating a document of text;
segmenting the text into a plurality of semantically coherent units using a coherence-aware text segmentation (CATS) machine learning model, the CATS machine learning model being a multi-task learning model that alternatively minimizes a sentence-level segmentation objective and a coherence objective and which differentiates correct sequences of sentences in the document from corrupt sequences of sentences in the document;
providing data characterizing the segmenting;
wherein:
the corrupt sequences of sentences in the document are generated by: randomly shuffling an order of sentences in the document followed by randomly replacing sentences in the document;
the CATS model is generated by through cross-lingual zero-shot transfer in which a supervised alignment model is used to project target-language vectors from an independently trained embedding space of a target language to a monolingual embedding space of a source language, the supervised alignment model being based on solving a Procrustes problem.

12. The system of claim 11, wherein the CATS machine learning model comprises two hierarchically connected transformer networks.

13. The system of claim 12, wherein the document of text comprises a sequence of sentences of arbitrary length.

14. The system of claim 12, wherein the operations further comprise:
encoding the text into a plurality of tokens prior to the segmenting.

15. The system of claim 14, wherein the encoding comprises a concatenation of a pretrained word embedding and a position embedding.

16. The system of claim 14, wherein a first of the transformer networks is a token-level transformer that encodes sentences from their corresponding tokens.

17. The system of claim 14, wherein a second of the transformer networks is a sentence-level transformer which receives an output of the first transformer network and generates transformed sentence representations including a representation of a whole sequence of sentences.

18. The system of claim 17, wherein the operations further comprise:
providing the transformed sentence representation to a feed forward segmentation classifier to generate a binary segmentation prediction for each sentence; and
feeding an encoding of the document of text to a neural network to generate a coherence score.

19. The system of claim 11, wherein providing the data comprises at least one of: causing the data characterizing the segmenting to be displayed in a graphical user interface, loading the data characterizing the segmenting into memory, storing the data characterizing the segmenting in physical persistence, or transmitting the data characterizing the segmenting to a remote computing device over a network.

20. A computer-implemented method comprising:
receiving data encapsulating a document of text;
segmenting the text into a plurality of semantically coherent units using a coherence-aware text segmentation (CATS) machine learning model, the CATS machine learning model being a multi-task learning model that alternatively minimizes a sentence-level segmentation objective and a coherence objective and which differentiates correct sequences of sentences in the document from corrupt sequences of sentences in the document;
providing data characterizing the segmenting;
wherein:
the corrupt sequences of sentences in the document are generated by: receiving a training data set comprising a plurality of training documents each having a plurality of snippets having a plurality of sentences; for each snippet, generating a corrupt counterpart by randomly shuffling an order of sentences forming such snippet, randomly selecting a subset of the randomly shuffled sentences, and replacing the randomly selected sentences with randomly chosen sentences from other non-overlapping snippets;
the CATS model is generated by cross-lingual zero-shot transfer in which a supervised alignment model is used to project target-language vectors from an independently trained embedding space of a target language to a monolingual embedding space of a source language, the supervised alignment model being based on solving a Procrustes problem.

* * * * *